3,366,587
ADHESIVE COMPRISING DEXTRIN, HYDRO-
LYZED COPOLYMER OF VINYL ALKYL
ETHER/MALEIC ANHYDRIDE, AND N N-DI-
ALKYLAMINOALKYL PHENOLS
Melville W. Uffner, Easton, Pa., assignor to General
Aniline & Film Corporation, New York, N.Y., a
corporation of Delaware
No Drawing. Filed Aug. 24, 1965, Ser. No. 482,276
10 Claims. (Cl. 260—17.4)

This invention relates to new and improved adhesive compositions and, more particularly, to modified, dextrin-based adhesive compositions characterized by outstanding improvement in such properties as rewettability, tack, adhesion bond strength, resistance to bacterial attack and the like.

Dextrin-based adhesive compositions, despite their relatively extensive commercial exploitation, have nevertheless proved unsatisfactory in a number of important respects. For example, considerable difficulty has been encountered in connection with attempts to coat dextrin-based adhesive solutions onto suitable substrates such as paper and especially where high speed machine coating techniques are employed. Particularly objectionable has been the tendency of dextrin-based adhesive solutions to "cotton" or "string" during the coating operation, thereby leading to the formation of non-uniform adhesive layers. The terms "cotton" and "string" are substantially synonymous in meaning and have art-recognized significance. In general, such terms refer to the tendency of certain adhesive compositions, and especially those based on dextrin, to form strand-like projections as a result of being drawn out by the applicator agency, e.g., roll, transfer pad and the like. As will be readily apparent, the net result is invariably an unintended deposition of adhesive solution in nonprescribed areas, which in many cases renders the product useless for the purposes intended. The foregoing situation imposes serious obstacles to the efficacious use of high speed coating machinery, as indicated previously, to the extent of necessitating certain remedial adjustments in the adhesive formulations. On many occasions such adjustments have been at the sacrifice of such desirable, if not essential, properties as quick adhesive grab, fast drying speeds and high viscosity.

Numerous procedures have been provided in an effort to overcome or otherwise mitigate the aforedescribed problems. Most of the suggested procedures relate in some manner to reducing the viscosity of the adhesive composition. However, although some improvement has been obtained with respect to the minimization of "cottoning," "stringing" and the like, such improvement is invariably accompanied by adverse effects upon such other properties as quick adhesive grab, while extending considerably the drying intervals required. For example, it has been suggested to effectively decrease the solids contents of dextrin-based adhesive compositions by diluting same with copious amounts of water, to thereby reduce the overall speed of tack, the latter being considered one of the primary causes of "cottoning." Other procedures are based on the inclusion of certain additives such as urea, dicyandiamide and the like in the adhesive formulation in order to reduce solution viscosity.

Although procedures of the foregoing type have proved somewhat effective, there nevertheless remains considerable room for improvement not only with respect to the minimizing of the aforedescribed "cottoning" effects but, in addition, with respect to the retention of such other properties as quick adhesive grab, fast drying rates, adhesion bond strength and the like.

In accordance with the present invention there are provided novel adhesive compositions which eliminate the problem of "cottoning" virtually entirely without in any way deleteriously affecting any of the other properties considered essential in a commercially acceptable adhesive composition. In fact, one of the surprising features provided by the composition of the present invention resides in the discovery that the desired elimination of "cottoning" is obtained while at the same time realizing exceptional improvement in such other adhesive properties as quick adhesive grab, adhesion bond strength and the like.

It is thus a primary object of the present invention to provide improved dextrin-based adhesive compositions which are not subject to one or more of the above disadvantages.

It is a further object of the present invention to provide improved dextrin-based adhesive compositions characterized by the substantial absence of any tendency to "cotton."

It is a still further object of the present invention to provide improved dextrin-based adhesive compositions characterized by exceptional improvement in such properties as quick adhesive grab, rewettability, adhesion bond strength, resistance to bacterial attack and the like.

Other objects will become apparent hereinafter as the description proceeds.

The attainment of the foregoing and related objects is made possible in accordance with the present invention which includes in its broader aspects the provision of adhesive compositions containing as essential ingredients, (1) dextrin, (2) a hydrolyzed inter-polymer of maleic anhydride and a vinyl alkyl ether, e.g., vinyl methyl ether, and (3) a phenol compound containing as nuclear substituents one or more dialkylaminoalkyl groups.

Adhesive compositions of the type provided herein are substantially devoid of any tendency to "cotton" even when employed in high-solid concentrations and, accordingly, may readily be applied by high-speed machine coating techniques to a variety of substrate materials. This is a particularly advantageous feature of the present adhesive compositions since it permits coating operations to be carried out more efficiently at higher speeds thereby realizing a significantly increased product throughout. In addition, adhesive compositions constituted in accordance with the present invention exhibit marked improvement with respect to such properties as gloss, rewettability, drying speeds, lay-flat, tack speed following remoistening with water and permit the achievement of deeper penetrations into paper substrates treated therewith.

Of further significance is their exceptional resistance to bacterial growth and putrefaction on aging. Moreover, the present adhesive compositions are uniformly characterized by a substantial reduction in any tendency to "block," i.e., to bond prematurely whether the particular environment be paper-to-coating or coating-to-coating.

In general, the adhesive compositions of the present invention correspond to the following formula, with all parts given by weight:

| | Parts | Preferred Range |
|---|---|---|
| Dextrin | 100 | |
| Hydrolyzed poly[vinyl alkyl ether/maleic anhydride]-PVM/MA | .01, 100 | 5–20 |
| Dialkylaminoalkyl phenol | 0.01–20 | 0.5–1 |
| Water | To desired solids | |

It is highly important to the synergistic results provided by the adhesive compositions of the present invention that at least one each of the three essential ingredients designated in the above formula be present. In this regard it has been found that compositions resulting from the exclusion of any one of the dextrin, hydrolyzed polymer or phenol compounds do not appreciably reduce the "cottoning" tendency.

The preferred proportions of each of the above components are significant not only from an economic standpoint, but in addition, from the standpoint of assuring high solids formulations. Moreover, optimum results are realized by employing the PVM/MA hydrolysate in greater proportions than the phenol derivative, with particularly beneficial results accruing when utilizing PVM/MA hydrolysate-phenol weight ratios on the order of at least 4–5:1.

The dextrin materials found to be eminently suitable for use in the present invention are well known in the art and are readily available commercially. The substances can be prepared from British gum, a Canary or yellow dextrin, a white dextrin or other similar type starch conversion product. As is well known, the foregoing materials are produced by roasting starch for varying times and/or temperatures optionally, in the presence of such other materials as acids, oxidizing agents and the like depending upon the particular product being produced. In any event, the particular form in which the dextrin is available is not particularly critical, the only requirement with respect thereto being that such material conform to maximum commercial requirements as regards quality, purity, etc.

The preparation of the dextrin solution is accomplished according to well established industrial techniques which consist mainly of soaking the dextrin in cold water for approximately ½ hour and then heating the resultant slurry to approximately 180° F. This temperature is maintained until solution of the dextrin is achieved. Usually, the desired solution can be effected in time intervals on the order of ½ hour.

The maleic anhydride vinyl methyl ether (PVM/MA) interpolymers preferred for use in preparing the hydrolysates found to be especially suitable in the adhesive compositions of the present invention are those available under the trade name GANTREZ AN, a product of General Aniline & Film Corporation. This material is a linear, resinous, copolymer of methyl vinyl ether and maleic anhydride in several molecular weight ranges, any of which are eminently suitable for use in the present invention.

(A) Interpolymers of the foregoing type can be represented structurally according to the following general formula:

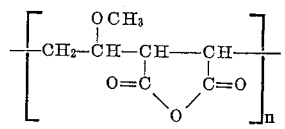

wherein n is an integer of from about 1,000 to about 25,000, and thus the molecular weight may range from about 156,000 to about 4,000,000.

It is the usual practice in commerce to characterize the foregoing products in terms of their specific viscosities, this being considered a more reliable indicia for polymer classification. In terms of specific viscosity, the polymer products encompassed by the above formula range from a value of about 0.1 to about 3.5 (determined at 1.0% concentration in methyl ethyl ketone at 25° C.) with a range of 1.5 to 3.5 being preferred. Products within the higher specific viscosity ranges are preferred ordinarily, since they characteristically provide greater tack and faster as well as more aggressive remoistenability.

Hydrolysis of the (PVM/MA) polymeric material can be easily effectuated according to either of two procedures and can be represented structurally as follows:

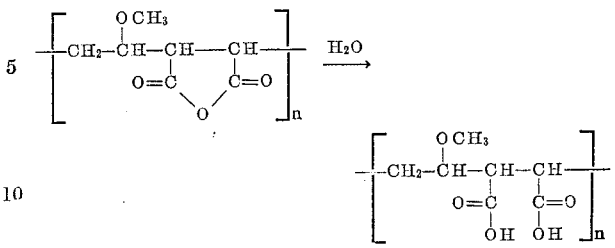

In one procedure, the PVM/MA is merely added to water and allowed to hydrolyze at room temperature for time periods ranging from 24 to 48 hours depending upon the degree of hydrolysis desired. The PVM/MA is readily soluble in water and solution concentrations as high as 50% can readily be prepared in the foregoing manner. The hydrolysis reaction is also promoted by the use of occasional stirring. According to a second procedure, the desired hydrolysis is carried out as described previously except for the application of heat which tends to accelerate formation of the hydrolysate. Temperatures within the range of 90-95° C. are found to be especially suitable for this purpose. When proceeding according to the latter method, excellent results are obtained if the water is preheated to the indicated temperature range and stirred to produce a rapidly whirling vortex. Thereupon, the PVM/MA is introduced directly into the vortex whereby the polymer powder rapidly wets out and disperses. The terminal point in the hydrolysis reaction regardless of the particular method employed is indicated by a decrease in solution viscosity and an almost instantaneous change in appearance from milky white to transparent.

Since the adhesive compositions of the present invention are provided in the form of aqueous systems, complete hydrolysis of the PVM/MA copolymer is a necessary consequence, i.e., unavoidable, and thus all of the pendant anhydride units would be converted to free acid form, i.e., carboxyl. In any event, the full hydrolysis result is a particularly desirable one since it accounts substantially for increased speed of remoistenability as well as the tack properties of the adhesive compositions formulated therewith. As will thus be readily apparent, the PVM/MA material may be added to the aqueous dextrin solution and converted to free acid form by an in situ hydrolysis.

As indicated in the general adhesive formula given hereinbefore, the amount of hydrolyzed PVM/MA which can be effectively employed therein may range from .01 to 100 parts per 100 parts dry weight of dextrin material with a range of 5 to 20 parts being preferred.

Within the foregoing ranges, it is found that higher film gloss and higher viscosity as well as more aggressive tack and remoistenability are obtained with the use of increased amounts of PVM/MA derivative. In any event, depending upon the particular properties desired, optimum proportions can readily be ascertained by routine experimentation well within the purview of the skilled worker.

The third essential component of the adhesive formulation of the present invention is, as indicated hereinbefore, a phenol compound containing as nuclear substituents at least one, and preferably 1 to 3, N N-diakylaminoalkyl groups. These compounds may conveniently be represented by the following general formula:

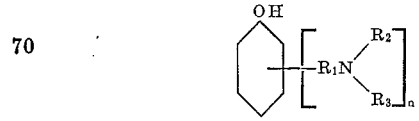

wherein $R_1$ represents alkylene and preferably lower alkylene of 1 to 4 carbon atoms, e.g., methylene, ethylene, propylene, etc.; $R_2$ and $R_3$ represent lower alkyl such as methyl, ethyl, propyl and the like and may be the same or different; and $n$ is an integer of 1 to 3. As examples of compounds coming within the foregoing formula there may be mentioned specifically the following: 2-dimethyl-aminomethyl phenol; 2,4-di(dimethylaminomethyl) phenol; 2,4,6-tri(dimethylaminomethyl) phenol, 2,4,6-tri(dimethylaminomethyl) phenol, etc. Products of the foregoing type are available commercially from the Rohm & Haas Co. under the trade name designations DMP–10 and DMP–30. It should also be understood that mixtures of two or more of the foregoing phenolic compounds may be used to advantage in the compositions of the present invention.

The order in which the dextrin, hydrolyzed PVM/MA and phenolic components are combined in preparing the adhesive compositions is not particularly critical and thus various formulation procedures may be employed. For example, excellent results are obtained according to the procedure which involves adding the dialkyl-aminoalkyl phenol to an aqueous solution, the latter having been prepared in the manner described hereinabove. The hydrolyzed PVM/MA interpolymer is then added to the foregoing mixture followed by dilution of same with water to the desired solid concentration. Alternatively, the dialkylaminoalkyl phenol and hydrolyzed PVM/MA can be pre-mixed in the form of an aqueous solution and thereafter added to the dextrin solution. As a further alternative procedure, the dialkylaminoalkyl phenol can be added to a preformed aqueous solution of the hydrolyzed PVM/MA and dextrin. As indicated hereinbefore, hydrolysis of the PVM/MA interpolymer may be effectuated in situ with the dextrin and/or phenol compounds thereby avoiding any necessity for a separate pre-hydrolysis step. Regardless of the particular method employed, the relative proportions of the aforedescribed compounds should come within the ranges hereinabove stated in order to insure the obtention of optimum results.

It should further be understood that the novel adhesive compositions of the present invention can be further modified to advantage by the addition thereto of various other ingredients conventionally employed in compositions of this type. As examples, of such added ingredients there may be mentioned plasticizer humectants, preservatives, fluidifiers, diluents, fillers, defoamers, polymeric materials such as the acrylates, polyvinyl acetate and the like. It should be borne in mind that any such addition should be consistent with the advantages provided by the present invention and should in no way interfere or otherwise adversely affect the end uses contemplated therefor.

The adhesive compositions of the present invention find utility in a wide variety of applications. For example, such compositions can be used to considerable advantage as wet-application adhesives for the bonding of paper products, in case and carton sealing, tube winding, bottle labels, bag manufacture (as a seam adhesive and bottom adhesive), and as a back seam gum in the manufacture of envelopes, etc.

Moreover, such adhesive compositions can also be applied as a re-moistenable front seal gum for envelopes and as a re-moistenable coating for paper tapes. A particularly advantageous application for the adhesives of the present invention relates to the preparation of formulations of smooth machining paper, fabric sizes and the like.

The following example is given for purposes of illustrating the present invention only, and is not to be regarded in any way as being limitative thereof. Parts are given by weight.

*Example 1*

An aqueous dextrin solution (68%) is prepared in the following manner: Commercial-grade dextrin is soaked in cold water for approximately ½ hour. The mixture thus obtained is then heated to approximately 180° F. and maintained at this temperature until solution of the dextrin is completed which requires approximately ½ hour. 1.33 parts of 2,4,6-tri-(dimethylaminomethyl) phenol are then added with stirring to 49 parts of the aqueous dextrin solution as prepared above. 9.33 parts of a 25% aqueous solution of PVM/MA GANTREZ AN–119 (a product of General Aniline & Film Corporation) is then added to the foregoing mixture. Stirring is maintained to produce a uniformly dispersed slurry of the foregoing ingredients. The above composition exhibits wet adhesive properties and re-moistenable adhesive properties superior to those characterizing dextrin-based adhesive compositions which have not been modified in accordance with the teachings of this invention. Moreover, the above composition is highly conducive to smooth machine application techniques, particularly when employing high speed coating operations, as evidenced by the virtual absence of any "cottoning" effects.

This invention has been disclosed with respect to certain preferred embodiments thereof and there will become obvious to persons skilled in the art various modifications and variations thereof which are intended to be included within the spirit and scope of this invention.

What is claimed is:

1. An aqueous adhesive composition comprising as essential ingredients—(a) dextrin, (b) a hydrolyzed interpolymer of a vinyl alkyl ether and maleic anhydride, and (c) at least one compound of the formula:

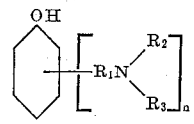

wherein $R_1$ represents lower alkylene, $R_2$ and $R_3$ represent lower alkyl, and $n$ is an integer of 1 to 3.

2. A composition according to claim 1 wherein (b) is a hydrolyzed interpolymer of vinyl methyl ether and maleic anhydride.

3. A composition according to claim 1 wherein (c) is 2,4,6-tri-(dimethyldiaminomethyl) phenol.

4. A composition according to claim 1 wherein (c) is 2-dimethyldiaminomethyl phenol.

5. An aqueous adhesive composition comprising as essential ingredients (a) dextrin, (b) from 5 to 20 parts per 100 parts dry weight of dextrin of a hydrolyzed interpolymer of a vinyl alkyl ether and maleic anhydride, and (c) from 0.5 to 1 part per 100 parts dry weight of dextrin of at least one compound of the formula:

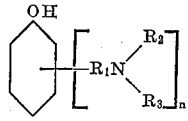

wherein $R_1$ represents lower alkylene, $R_2$ and $R_3$ represent lower alkyl, and $n$ is an integer of 1 to 3.

6. A composition according to claim 5, wherein (b) comprises a hydrolyzed interpolymer of vinyl methyl ether and maleic anhydride.

7. A composition according to claim 6, wherein said hydrolyzed interpolymer of vinyl methyl ether and maleic anhydride possesses a specific viscosity as determined at 1.0 percent concentration in methyl ethyl ketone at 25° C. within the range of about 0.1 to about 3.5.

8. A composition according to claim 7, wherein said specific viscosity is within the range of 1.5 to 3.5.

9. A composition according to claim 5, wherein (c) is 2,4,6-tri-(dimethyldiaminomethyl) phenol.

10. A composition according to claim 5, wherein (c) is 2-dimethyldiaminomethyl phenol.

No references cited.

WILLIAM H. SHORT, *Primary Examiner.*

J. NORRIS, *Assistant Examiner.*